Sept. 20, 1966   E. W. KLEINLEIN   3,273,670
VIBRATIONAL DAMPER
Filed June 1, 1964

INVENTOR.
ELMER W. KLEINLEIN
BY
Dale A. Winnie
ATTORNEY

United States Patent Office 3,273,670
Patented Sept. 20, 1966

3,273,670
VIBRATIONAL DAMPER
Elmer W. Kleinlein, Troy, Mich., assignor to American Motors Corporation, Detroit, Mich., a corporation of Maryland
Filed June 1, 1964, Ser. No. 371,540
2 Claims. (Cl. 188—1)

This invention relates to dampers in general and more particularly to vibrational dampers for use with hermetically sealed refrigeration compressor units and the like to prevent the emission of audible noise.

It is quite common to use some form of vibration damper or isolator with motor-compressor units which are disposed in hermetically sealed housings and are provided on household refrigerators or the like. The units are usually mounted on springs which serve as isolators but in many instances they require some form of damper for the housing shell itself if it is thin walled and drum-like so that it is responsive to vibrational energy induced by the motor-compressor units in the course of their operation.

One of the most suitable dampers for compressor housing members is a frictional damper. They usually include a member that is secured to a housing wall and has parts which are free to contact the wall and dissipate any vibrational energy thereof. Such dampers may be circular in shape and are normally secured either centrally or peripherally to an outer wall of a housing member. In some instances they may be shaped to conform to general contours of the housing wall and to lie in close frictional engagement therewith.

Unfortunately, the external plate or disc type frictional damper has several disadvantages and the value of its use is questionable in many instances. For example, the external attachment subjects it to damage in handling and it is easily rendered inoperative when the whole unit is painted over. Still further, a damper which must be secured to the outer convex side of a housing shell must be pre-formed to assure proper engagement and may be more difficult and expensive to manufacture and to secure in place on the housing member.

It is an object of this invention to provide a simple and inexpensive sound damper for housing members and one of the frictional type commonly known and accepted.

It is an object of this invention to provide a new and different frictional damper for housing members and, more particularly, to teach mounting such a damper in a protective and more effective location on housings which must be painted.

It is an object of this invention to teach the use of an oblong friction damper disc and one which is slotted, bifurcated or otherwise formed from the peripheral edge inward to provide spring finger parts.

More specifically, it is an object of this invention to teach the use of an oblong shaped frictional damper disc having radial slots emanating from the center thereof and forming spreading fingers of different sizes. Such damper is to be made flat and to be secured inside a housing where it will not be made ineffective when the outside of the housing is painted. The damper is particularly suited for use on concave walls where its center section is secured to the housing wall and its spreading fingers are assured biased frictional engagement with the walls to be damped.

The peripheral shape of the proposed damper may be varied, as may its thickness, the number and length of spring fingers, and where and how it is secured to the housing wall to be damped, provided that this is done within the limits defined and set forth hereinafter.

These and other objects and advantages to be gained in the practice of this invention will be better understood and more fully appreciated upon a reading of the following specification and having reference to the accompanying drawing.

Figure 1:
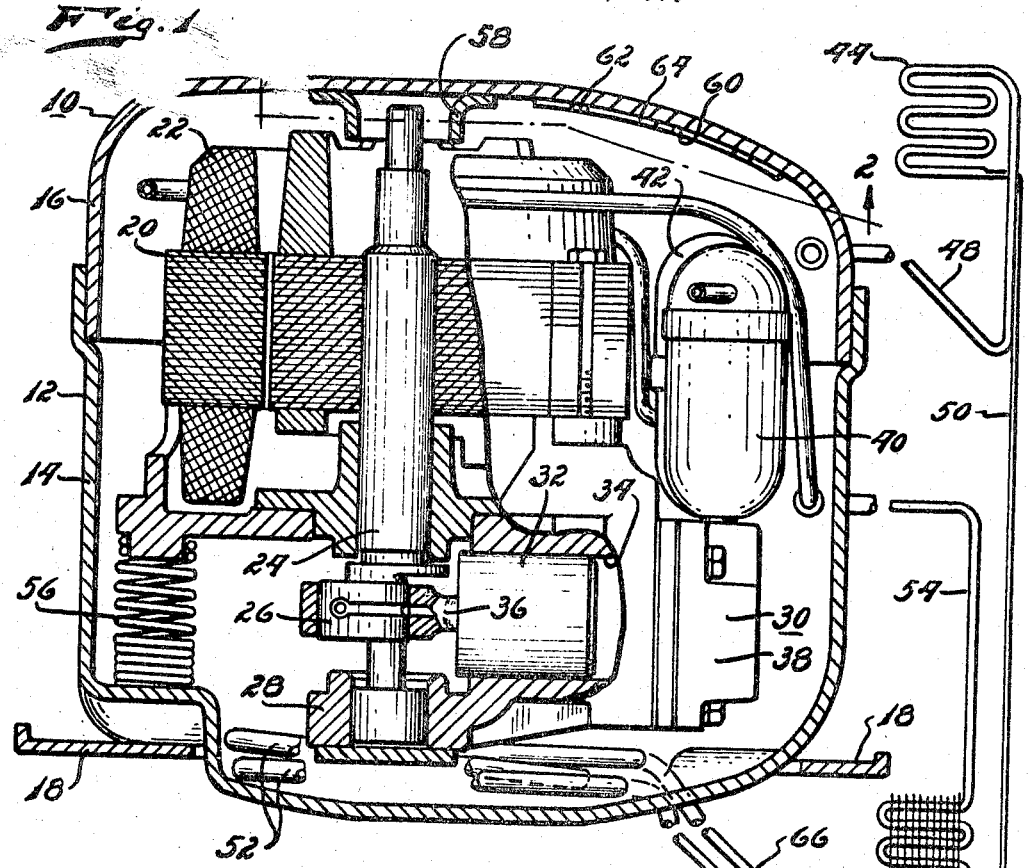
FIGURE 1 is a cross sectional view of a motor compressor unit which is part of a refrigeration system and shows such system schematically in combination therewith.
Figure 2:
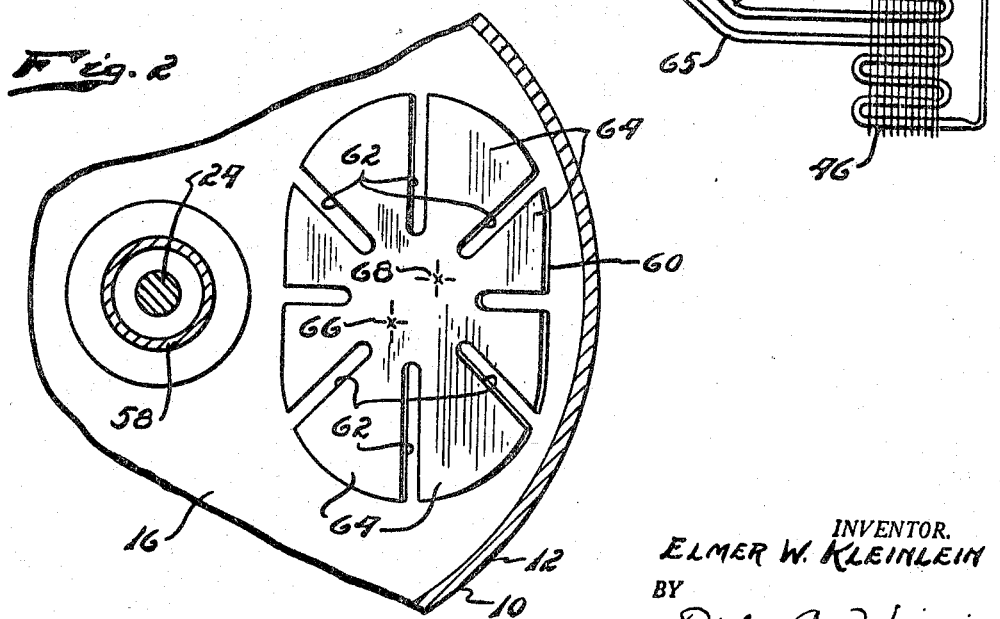
FIGURE 2 is a plan view of a fragmentary section of the motor-compressor housing shown by FIGURE 1 as seen in the plane of line 2—2 thereon and looking in the direction of the arrows.

The motor compressor unit 10 is shown to include a housing 12 having a lower shell part 14 and a dome cover part 16. The latter is received in closing relation with the former and so that the two may be hermetically sealed together. Suitable bracket arms 18 are provided on the lower shell part 14 for attachment of the housing 12 to other supporting structure.

Within the housing 12 is provided an electric motor 20. The electrical power connection to the motor is not shown but it will be appreciated as connected to the motor coil 22. The crankshaft 24 includes an eccentric journal 26 at one end and has its lower journal received in bearing means 28.

The compressor part 30 of the assembly includes a piston member 32 which is disposed within a cylinder bore 34. The piston member is connected by a connecting rod 36 to the eccentric journal 26 of the crankshaft 24. A cylinder head 38 closes the bore 34 and suitable intake and discharge mufflers 40 and 42 are connected thereto.

As previously mentioned, the motor compressor unit 10 is part of a refrigeration system. Such refrigeration system includes an evaporator 44 and a condenser 46. A refrigerant line 48 is connected between the housing 12 and the evaporator 44. Another refrigerant line 50 is connected between the evaporator 44 and the condenser 46. Several coils 52 within the motor compressor unit 10 are connected to the condenser 46 with refrigerant lines 65 and 66. The condenser coil 46 is also connected by a refrigerant line 54 to the housing 12 and the discharge muffler 42 therewithin.

The motor compressor unit is mounted on axially and laterally flexible springs 56 within the housing 12.

A collar stop 58 is provided on the inner surface of the dome cover 16 and serves, principally in shipment, to prevent the unit from being damaged.

It will be noted that the collar stop 58 is off center and leaves a large dome cover area which is responsive to vibrational forces; particularly if the cover member is made of relatively thin sheet material, as is frequently done for economic reasons.

The frictional damper disc 60 of this invention is secured to the dome cover part 16 on the inner concave surface thereof. It is of relatively thin sheet metal material and has a stiffness which permits slight bending without deformation. It is formed substantially flat so that when deformed, as later described, the peripheral parts are held in biased engagement with the member to be damped.

The disc member 60 is oblong in shape therefore has a linear dimension which is greater in one direction than transversely thereof. It includes a plurality of radially disposed slots 62 which emanate from centrally thereof and serve to bifurcate the member and form a plurality of vibration damping fingers 64 of differing shapes and sizes.

The damper disc is secured to the inner surface of the dome cover part 16 where it is both shielded and protected from rust, corrosion or the like and will not be made ineffectual by being painted over as when on the outside of the housing member. Two spot welds 66 and 68 are made centrally of the disc to hold it to the inner surface of the dome cover part. The disc itself is oriented as much as possible to cover the vibrational responsive cover area part and at least be centered relative thereto. The spot welds are generally located centrally and as practical in line with a pair of the slots where they will not affect the vibrational damping responsiveness of the frictional spring fingers 64.

When the disc 60 is deformed to lie against the concave surface of the cover part 16, as shown by FIGURE 1, it will be appreciated that the peripheral edge of the fingers 64 not exclusively but in particular, are held in biased engagement with the cover walls. Also, they are differing size and shape so that they are responsive to differing vibrational frequencies and serve to effectively damp any tendency to vibration over the range of frequencies normally encountered in operation.

Although only a preferred form of the invention has been illustrated and that form described in detail, it will be apparent to those skilled in the art that various modifications may be made without departing from the spirit of the invention or from the scope of the appended claims.

I claim:
1. Sound attenuating means for use with motor-compressor units, and comprising,
   a substantially flat uniplanar member oblong in shape and having a plurality of bifurcating slots formed therein,
   said slots extending radially outward from centrally of said member breaking the outer edge and forming distinctly separate friction damper fingers of differing size and shape between respectively different of said slots,
   a motor compressor housing including a dome shaped cover member having an inner concave surface,
   and means for securing said bifurcated member within the protection of said dome shaped member and to the vibration responsive surface thereof for best covering said surface and having the peripheral extremities of said damper fingers frictionally engaged thereto.
2. The sound attenuating means of claim 1,
   said securing means including spot welds centrally disposed and relatively aligned across said bifurcated member.

References Cited by the Examiner
UNITED STATES PATENTS

| | | | |
|---|---|---|---|
| 1,940,449 | 12/1933 | Dodge | 188—1 |
| 2,285,924 | 6/1942 | Halvarson | 181—62 |
| 2,541,159 | 2/1951 | Geiger | 188—1 |
| 2,724,454 | 11/1955 | Rowe | 181—33 |

DUANE A. REGER, *Primary Examiner.*